United States Patent [19]
Rao

[11] Patent Number: 5,920,733
[45] Date of Patent: Jul. 6, 1999

[54] INTELLIGENT PERIPHERAL CONTROLLER FOR FORMATTING A STORAGE MEDIA UPON THE PERIPHERAL DEVICE RECEIVING A COMMAND AND READING FORMATTING ALGORITHM STORED WITHIN THE PERIPHERAL DEVICE

[75] Inventor: Mahesh C. Rao, San Jose, Calif.

[73] Assignee: Mitsubishi Kasei America, Inc., White Plains, N.Y.

[21] Appl. No.: 08/818,684

[22] Filed: Mar. 14, 1997

Related U.S. Application Data

[62] Division of application No. 08/317,642, Sep. 30, 1994, Pat. No. 5,640,592.

[51] Int. Cl.$^6$ .............................. G06F 13/10; G06F 13/12
[52] U.S. Cl. .......................... 395/888; 395/500; 395/834; 395/827
[58] Field of Search ...................... 395/888, 834, 395/500, 489, 497.04, 825, 827; 711/100

[56] References Cited

U.S. PATENT DOCUMENTS

| | | | |
|---|---|---|---|
| 4,268,905 | 5/1981 | Johann et al. | 395/500 |
| 4,280,193 | 7/1981 | Baun et al. | 364/900 |
| 4,348,761 | 9/1982 | Berger | 371/21.1 |
| 4,371,948 | 2/1983 | Chandra | 364/900 |
| 4,494,156 | 1/1985 | Kadison et al. | 360/48 |
| 4,591,675 | 5/1986 | Wade et al. | 395/733 |
| 4,641,207 | 2/1987 | Green et al. | 360/55 |
| 4,651,277 | 3/1987 | Sakaji | 711/167 |
| 4,675,755 | 6/1987 | Baumeister et al. | 386/52 |
| 4,695,945 | 9/1987 | Irwin | 395/856 |
| 4,747,040 | 5/1988 | Blanset et al. | 395/678 |
| 4,773,036 | 9/1988 | Berens et al. | 711/112 |
| 4,796,099 | 1/1989 | Compton | 386/55 |
| 4,819,153 | 4/1989 | Graham et al. | 360/69 |
| 4,866,601 | 9/1989 | DuLac et al. | 711/111 |
| 4,885,683 | 12/1989 | Coogan | 364/200 |
| 4,928,192 | 5/1990 | Bartlett et al. | 360/77.08 |
| 4,928,193 | 5/1990 | Agoglia et al. | 360/78.04 |
| 5,018,095 | 5/1991 | Nissimov | 711/4 |
| 5,073,854 | 12/1991 | Martin et al. | 711/112 |
| 5,119,353 | 6/1992 | Asakura | 369/13 |
| 5,142,626 | 8/1992 | Arnold et al. | 395/836 |
| 5,148,432 | 9/1992 | Godon et al. | 395/182.05 |
| 5,150,465 | 9/1992 | Bush et al. | 395/834 |
| 5,161,102 | 11/1992 | Griffin et al. | 395/284 |
| 5,237,689 | 8/1993 | Behnke | 395/651 |
| 5,265,252 | 11/1993 | Rawson, III et al. | 395/681 |
| 5,269,018 | 12/1993 | Lee | 395/185.01 |
| 5,293,388 | 3/1994 | Monroe et al. | 371/37.01 |
| 5,307,413 | 4/1994 | Denzer | 380/49 |
| 5,319,751 | 6/1994 | Garney | 711/115 |
| 5,357,614 | 10/1994 | Pattisam et al. | 395/888 |
| 5,430,845 | 7/1995 | Rimmer et al. | 395/681 |
| 5,463,772 | 10/1995 | Thompson et al. | 707/101 |

FOREIGN PATENT DOCUMENTS 04044673  2/1992  Japan.

*Primary Examiner*—Thomas C. Lee
*Assistant Examiner*—Rehana Perveen
*Attorney, Agent, or Firm*—Oblon, Spivak, McClelland, Maier & Neustadt, P.C.

[57] ABSTRACT

An intelligent controller of a peripheral device such as a disk drive which stores utility algorithms. In a first embodiment, the utility algorithms are transferred from the peripheral device to a host computer in order to eliminate the need to have utility software pre-loaded into the computer. In a second embodiment, the algorithm stored within the peripheral device is executed by processing circuitry within the peripheral device in order to free the host computer to perform other tasks as the utility is being executed by the peripheral device. Exemplary utilities which may be executed by the peripheral device include data compression, data format conversion, automatic disk error correction, back-up of the disk's file allocation table or other vital disk or file information into a secondary file allocation table within the peripheral device, automatic file back-up or any other desired utility. A variation of the second embodiment performs stand-alone formatting of a disk to free up a host computer to perform other activities.

14 Claims, 6 Drawing Sheets

INTELLIGENT PERIPHERAL CONTROLLER FOR FORMATTING A STORAGE MEDIA UPON THE PERIPHERAL DEVICE RECEIVING A COMMAND AND READING FORMATTING ALGORITHM STORED WITHIN THE PERIPHERAL DEVICE

This is a Division, of application Ser. No. 08/317,642, filed Sep. 30, 1994 (now U.S. Pat. No. 5,640,592).

BACKGROUND OF THE INVENTION

1. Field of the invention

The invention relates in general to an intelligent peripheral controller which stores algorithms which are normally executed by a host computer. The invention is further related to a peripheral controller which both stores and executes algorithms which are conventionally executed by the host computer.

2. Discussion of the Background

Common disk drive controllers and peripheral controllers in general are fairly unintelligent, do not perform functions without being commanded by a host computer and require constant attention by the computer in order to control the peripheral device. The functions performed within the host computer to control the peripheral device frequently prevent the host computer from performing other tasks and therefore, a user of the computer must wait until the function being performed within the peripheral device is completed before the computer is available to execute other commands. For example, when a computer formats a disk within a disk drive, the computer cannot be used until the formatting process is completed. While formatting a floppy disk may take only several minutes, formatting a hard disk, optical disk, or back-up tape may take up to several hours.

When external peripheral devices such as an external tape drive or disk drive are transferred between different computers, software needed to access the peripheral may need to be installed in each computer which uses the peripheral. For example, a disk drive using a disk which has compressed data would need to have the compression/ decompression algorithm stored within each computer which is to be connected to the disk drive. Additionally, peripheral devices are typically created for use with only one type of computer such as an IBM compatible computer, Macintosh computer, a computer running UNIX, or computers using other operating systems.

SUMMARY OF THE INVENTION

Accordingly, it is an object of the invention to provide a novel and useful peripheral controller and/or peripheral such as a disk or tape drive which may be used with a plurality of different types of computers.

It is a further object of the invention to provide a peripheral controller and/or peripheral device which contains a utility stored therein which is loaded into the host computer.

It is a further object of this invention to provide a peripheral controller and/or peripheral device which executes a utility program stored therein, thus freeing the host computer to perform other activities.

These and other objects are accomplished by a peripheral controller for use with a peripheral device such as a disk drive or tape drive which includes a selection device for setting the peripheral device to operate with any of a plurality of computers and operating systems such as an IBM compatible computer running a Microsoft compatible disk operating system such as MS-DOS or PC DOS, or OS/2, a Macintosh computer, a UNIX computer, a SCITEX computer, etc.

In one embodiment, the peripheral device includes one or more utility programs stored in a nonvolatile memory which upon initialization by the host computer is transferred from the peripheral device to the host computer. The host computer then executes the transferred utility. While this embodiment does not free-up the processing resources of the host computer, it eliminates the need to have the utility software pre-loaded into each host computer which is to be used with the peripheral. The utilities include one or more of a compression/decompression algorithm, a conversion algorithm which converts a file from an IBM compatible DOS format to a Macintosh format, an utility which automatically performs disk error correction, an utility which maintains a secondary file allocation table or other vital disk information such as disk structure, file structure, or directory structure off of the disk, or an automatic file back-up utility.

In an alternative to the embodiment in which any of the above utilities are only stored within the peripheral device and transferred to the host computer, the peripheral device includes processing circuitry which performs the functions of the above-described utilities using a microprocessor which executes the utility stored in the nonvolatile memory or by using special purpose hardware.

In addition to processing any of the above-described utilities, the processing circuit of the alternative embodiment may execute a utility algorithm which performs a formatting of a storage media within the peripheral device. The peripheral device in this variation will be a disk drive or tape drive, for example and will format a disk or tape independent of the host computer, thus allowing the host computer to perform other tasks while the peripheral device is formatting the storage media.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
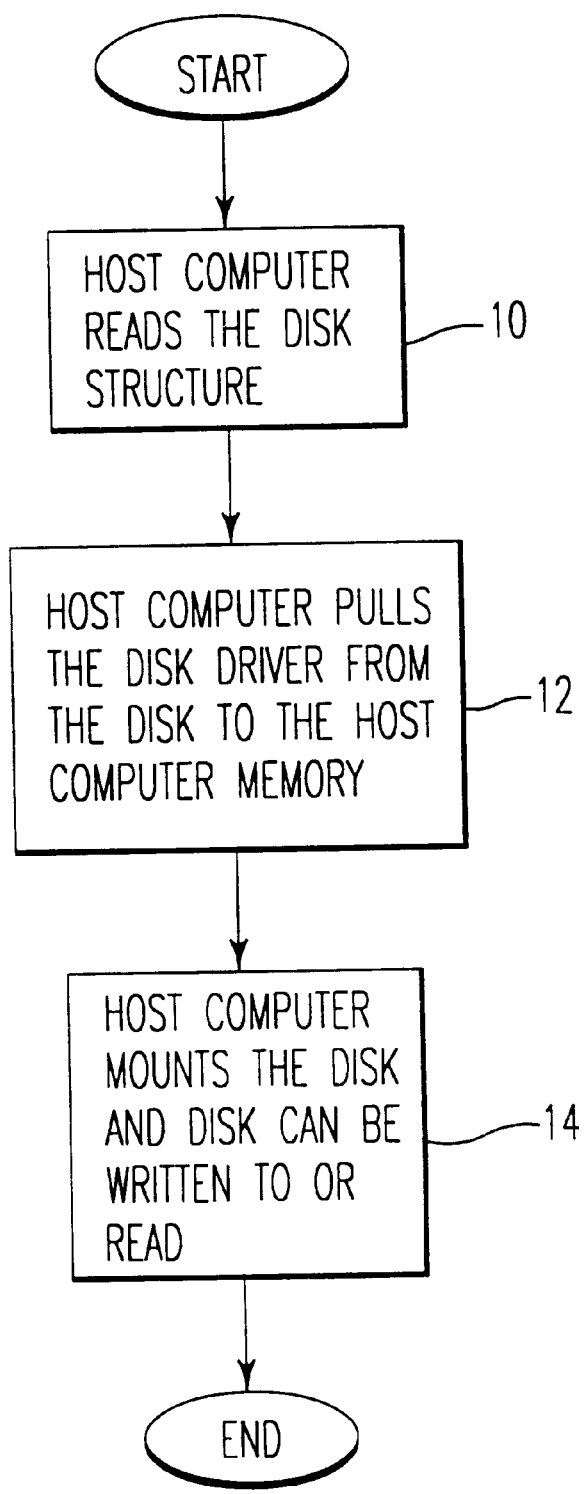
FIG. 1 illustrates a flowchart of a prior art process for accessing a disk drive by a Macintosh computer.

Referring now to the drawings, wherein like reference numerals designate identical or corresponding parts throughout the several views, and more particularly to FIG. 1 thereof, there is illustrated a flowchart of a process for initializing a conventional disk drive. The process illustrated in FIG. 1 is performed in a Macintosh computer when a disk drive of the Mac is initialized. Once the initialization process begins, the host computer reads the disk structure of the disk within disk drive in step 10. The disk structure is usually stored on an initial portion of the disk which is usually the inner-most portion of the disk or the outer-most portion of the disk, depending on the requirements of the computer system.

The host computer pulls or retrieves the disk driver which is located on the disk into the memory of the Mac in step 12. In step 14, the host computer then "mounts" the disk and the disk can be written to or read. The term "mounts" is a term of art which means that the disk drive has been initialized and recognized by a host computer and therefore can be utilized.

In step 12 of FIG. 1, the host computer pulls or reads the disk driver from the disk. The first embodiment of the invention operates by intercepting the instructions sent to read the disk driver and instead of transmitting only the disk driver to the host computer, a utility algorithm stored in a nonvolatile memory off of the disk is transmitted in addition to the disk driver (if the disk driver exists). This allows for an automatic and convenient way to load software into the host computer without the need for a user to manually preload the utility software in each host computer which is to be utilized with the disk drive. The peripheral devices used with the invention, such as a disk drive or tape drive have a primary purpose of storing information on a medium such as a disk or tape, within the drives and are defined to be storage peripheral devices. The disk or tape is the primary storage media of the disk drive and the nonvolatile memory storing the utility algorithms is not considered to be the primary storage media of the peripheral device. The utility algorithm is different from the operating system which executes within the host computer.

It is to be noted that some of the drawings and descriptions of the invention refer to a SCSI ("Small Computer Systems Interface") disk drive and the described mounting procedure of the disk drive commonly pertains to a Macintosh computer. However, the teachings of the invention are applicable to any type of computer in addition to a Macintosh such as an IBM compatible computer running any type of operating system including a Microsoft compatible DOS, Microsoft Windows, OS/2, or UNIX, or any other computer running any operating system. The invention is also not limited to a particular type of peripheral device but is applicable to any type of peripheral device, whether internal or external to the host computer, including a tape drive, a hard disk, a removable hard disk, a floppy disk, an optical disk, a magneto-optical disk, etc.

Figure 2:
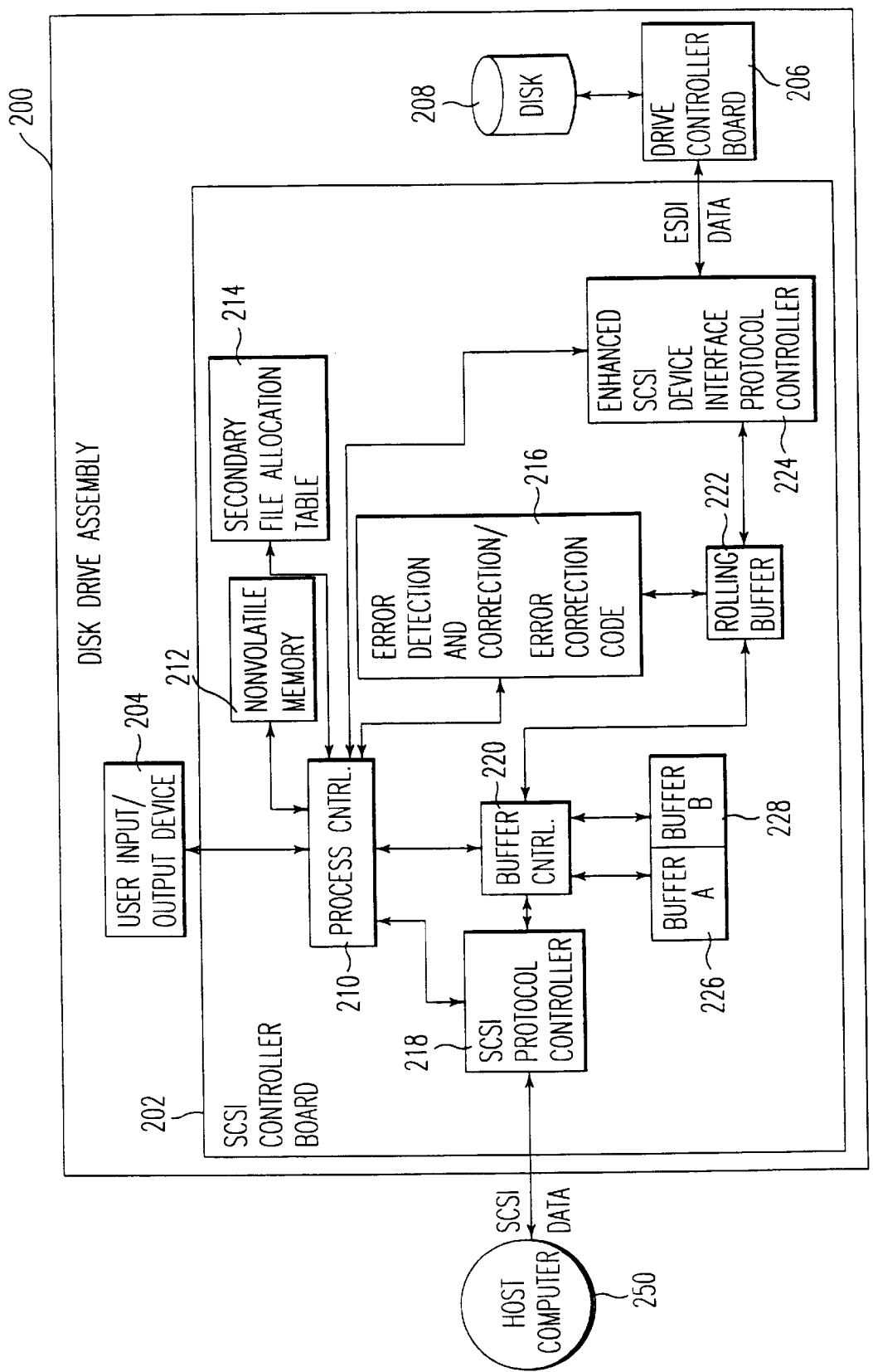
FIG. 2 is a hardware diagram of the present invention in which a utility stored within the disk drive assembly is uploaded to the host computer.

FIG. 2 illustrates a first hardware embodiment of the present invention. A host computer 250 is connected to a disk drive assembly 200. A host computer is defined to be any type of computer which connects to a peripheral device such as the disk drive assembly 200. The disk drive assembly 200 contains a SCSI controller board 202, a user input/output device 204, a drive controller board 206, and a disk 208. The host computer 250 communicates with the disk drive assembly 200 by exchanging SCSI data with the SCSI controller board 202.

The user input/output device 204 is any device for inputting commands to the disk drive assembly including a dip switch, a rotary switch having a plurality of settings, a keypad, a keyboard, a pointing device such as a mouse or any other type of device through which a user of the disk drive assembly makes various selections or enters commands. The commands which the user inputs depend on the features of the peripheral device and the utility algorithm(s) stored within the peripheral device. In a variation of the invention, the user may select an emulation of the disk drive assembly (e.g., whether the disk drive assembly is to operate the disk inside as a Macintosh disk, an IBM disk, etc.). If the algorithm is transferred to and executed by the host computer, the host computer will have the ability to begin, suspend, and modify the operation of the utility. In the second embodiment in which the algorithm is executed within the disk drive assembly, the user will be able to begin, suspend, and modify the execution of the utility using the user input/output device 204 or the host computer. The output which is provided by the user input/output device 204 in any of the embodiments of the invention includes a visual output such as illumination of an LED to indicate a status of the disk drive assembly, or a more sophisticated display such as a liquid crystal display which provides the user with a simple indication or more advanced alpha-numeric information regarding the state of the disk drive assembly. The input/output device will include an audio output device if the user desires an audible indication of the status of the disk drive and/or a process executing therein. For example, a speaker may beep when a formatting process is complete, in addition to a visual output provided by the device 204 indicating that the formatting is complete.

The SCSI controller board 202 is connected to the host computer 250 through a SCSI cable having the appropriate connectors for attachment to the host computer and disk drive assembly. The SCSI controller board 202 controls the high level operations of the disk drive assembly while the drive controller board controls the low level tasks. The low level tasks controlled by the drive controller board 206 pertain to the physical operation of the disk drive including positioning of the head, and commands to read or write from the disk such as the power of a laser reading/writing the optical disk, for example. Other commands which do not directly pertain to the rudimentary control and positioning of the disk heads, disk speed, etc., are considered high level commands and are processed by the SCSI controller board 202.

The SCSI controller board 202 contains a process controller 210 which oversees control of the disk drive assembly. The process controller 210 is connected to and controls the elements on the SCSI controller board 202. Incoming data from the host computer 250 and outgoing data to the host computer 250 pass through the SCSI protocol controller 218. Controller 218 separates the SCSI protocol data which essentially defines the format and handshaking protocols from the other useful data used by the disk drive assembly. A buffer controller 220 controls the movement of data within the SCSI controller board to and from the host computer 250 and the disk 208. The buffer controller 220 directs incoming data from buffer A 226 while previously stored data in buffer B 228 is forwarded to a rolling buffer 222. After buffer B 228 is empty, incoming data from the host computer 250 is directed by the buffer controller 220 to buffer B 228 while buffer A 226 transfers data therein to rolling buffer 222. The rolling buffer 222 contains two or three buffers. The data sent to the rolling buffer 222 is stored in one of the buffers thereof and transferred or monitored by the error detection and correction/error correction code ("EDAC/ECC") device 216 which detects any errors and corrects them as necessary. The enhanced SCSI device interface protocol controller ("ESDI/PC") changes the format of data from the SCSI controller board to be compatible with the drive controller board and vice versa. Commands which are issued to the drive controller board relate to primitive disk commands such as head movement and head read/write status and the drive controller board 206 processes primitive disk commands to perform reading to and writing from the disk 208.

Nonvolatile memory 212 is a memory device such as a ROM, flash memory, EPROM, EEPROM, CMOS RAM with a battery back-up, or any other type of nonvolatile memory which stores information. When nonvolatile memory 212 is a memory which is writable to a plurality of times, the nonvolatile memory 212 is easily updated with new versions of the algorithms without physically substituting memory chips constituting the nonvolatile memory 212. The nonvolatile memory 212 stores firmware which is the logic for controlling the operation of the SCSI controller board 202 in addition to utility algorithms. The nonvolatile memory 212 is illustrated as one element but a variation of the invention has physically separate memories storing the firmware and the utility algorithms. A utility or utility algorithm is any program used to enhance the operation of a computer. Upon initialization in the first embodiment of the invention, the utility within the nonvolatile memory 212 is transferred to the host computer through the process controller 210, buffer controller 220, and SCSI protocol controller 218. As a variation to storing the utility in the nonvolatile memory 212, the utility is stored on the disk instead of the nonvolatile memory 212.

When the utility algorithm detects and corrects disk errors, a secondary file allocation table 214 which is any of the nonvolatile memories discussed with respect to the nonvolatile memory 212 is used to store a back-up copy of the file allocation table structure of the disk 208. While the secondary file allocation table 214 which is commonly used with IBM PCs and compatibles has been illustrated in the drawings, the invention is not limited to IBM PCs or "file allocation tables". Therefore, the secondary file allocation table 214 may be a back-up of vital areas of the disk such as information stored on the disk describing the disk structure, file structure, directory structure, or any other features of the disk or storage device or files stored thereon. In order to restore the secondary file allocation table or any other backed-up vital area back to the disk, the user is queried to determine if it is desired to overwrite the vital area on the disk. If the answer is affirmative, the secondary or back-up information stored in the nonvolatile memory 212 is written to the disk.

In an IBM PC, a file allocation table contains the status of sectors on a disk and indicates whether a sector is free or used by a file. If an error should occur in the file allocation table or other vital information stored on disk 208, the information from the secondary file allocation table 214 is transferred to the disk 208 so that the data corresponding to the bad portions of the file allocation table or other vital information of the disk 208 is not lost.

In the present invention, power is supplied to each of the elements illustrated in FIG. 2 in a conventional manner using either a battery, an alternating current source, or any other type of power source.

Figure 3:
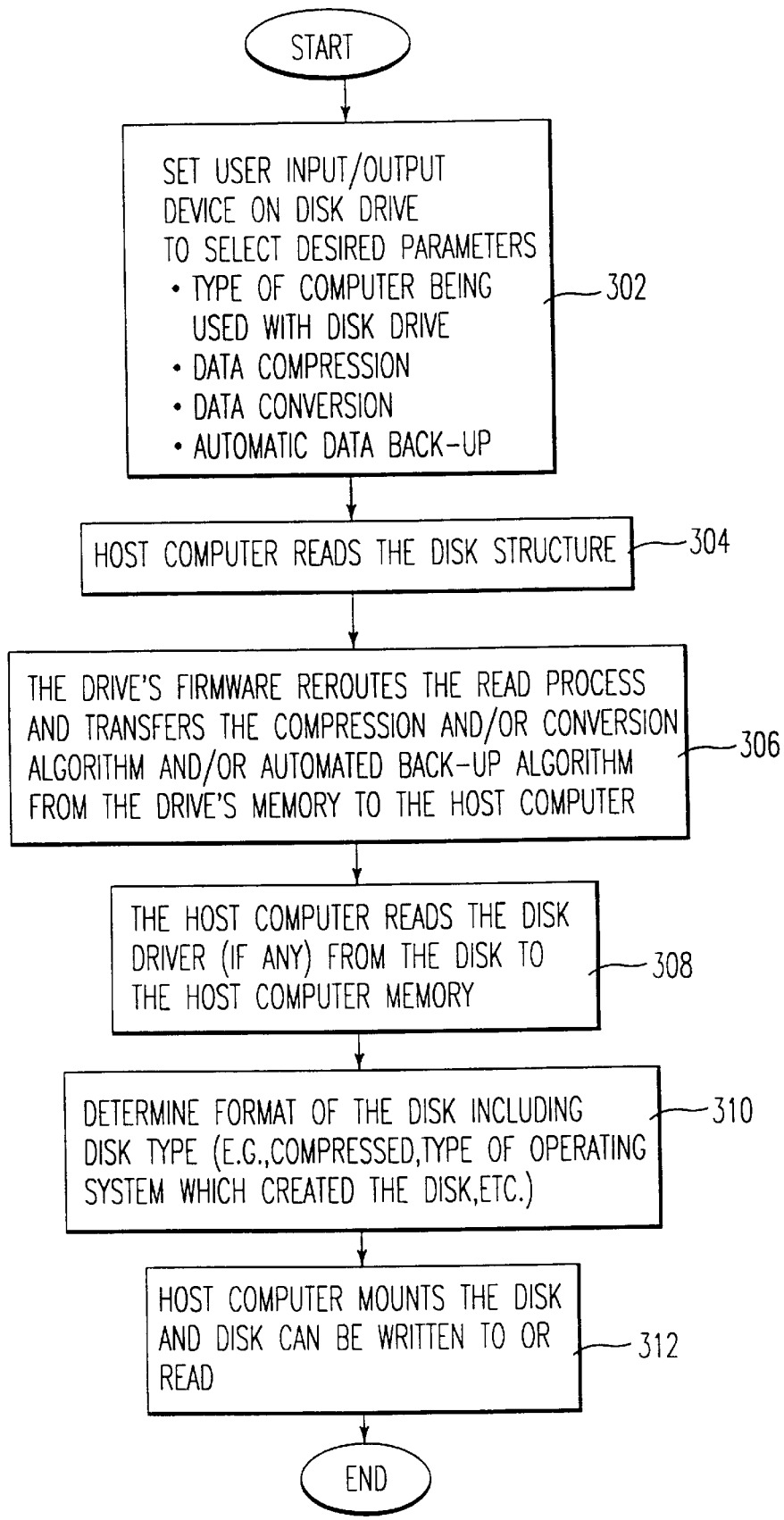
FIG. 3 is a process for initializing a disk drive and uploading a utility within the peripheral device to the host computer.

FIG. 3 illustrates a process of the first embodiment of the invention in which a utility stored within the disk drive is uploaded to the host computer for execution by the host computer in order to eliminate a manual loading and/or running of the utility by a user. After starting, in step 302 the user selects the desired settings for the disk device to determine the operating parameters through the user input/output deice 204. Exemplary parameters which are selected by the user include the type of computer which is being used with the disk drive (e.g., Mac, IBM, a Silicon Graphics computer, Sun workstation, etc.), and parameters pertaining to the execution of the utility algorithm such as whether or not functions such as data compression, data format conversion, automated data back-up including file back-up, file allocation table back-up or other vital areas of the disk back-up, or general error checking and correction is to be performed within the disk drive. As a variation of the manner of inputting parameters, the desired settings are selected through commands input to the host computer except for the type of computer which is being used with the disk drive which is either set on the disk drive or automatically detected by the disk drive.

The specifications of peripheral devices which are to be used with specific types of computers are publicly available and the setting of the user input/output device causes the disk drive device to operate according to the required parameters of the selected type of computer. The parameters for each of the computers which are usable with the disk drive are stored within the disk drive and utilized in order to achieve proper control and communication between the host computer and disk drive.

A description of the various types of algorithms which are utilized by the present invention including data compression algorithms, data conversion algorithms, error correction algorithms, and file-backup algorithms will now be discussed.

Various types of data compression algorithms which allow data to be stored using less storage space are known and publicly available. For example, the program Stacker by Stack Electronics and Double Space for IBM compatible computers contain exemplary compression algorithms which are used by the present invention.

Data conversion algorithms, also referred to as format conversion algorithms, are known and also publicly available. The data conversion algorithm converts files from one operating system format to another format. For example, a data file for use in an IBM compatible computer is converted and transferred for use with another type of computer such as a Macintosh and vice versa. Commercially available programs which may be utilized by the present invention to perform data conversion from one computer format to another are MAC-IN-DOS by Pacific Micro which converts files from a Macintosh format to an IBM PC format, Soft Windows by Insignia which converts files from an IBM PC format to a Macintosh format, and Transfer Pro by Digital Instrumentation Technology, Inc. which converts files between various formats such as SUN, Silicon Graphics, Hewlett Packard and OS/2.

In addition to file conversion between formats of different operating systems, file conversion also takes place for files which are used with different brands of application programs. For example, word processing, spreadsheet, database, or graphics data files are converted from one format to another by the present invention. An exemplary program which converts graphical files from one format to another such as TIFF to PICT, for example, is "HiJack PRO" from Inset Systems. Most commercially available advanced word processing programs, database programs, and spreadsheet programs also have the ability to convert data files which are native to the particular application to data files which are used in a competitor's format.

The automated error monitoring and correction feature of the invention performs automatic monitoring of the disk in general and corrects errors as they occur. A specific implementation of the automated error monitoring and correcting includes backing-up the file allocation table/structure of the disk or other vital areas of the disk into the secondary file allocation table 214.

An additional algorithm which is executed by the invention is an automated back-up program which makes a back-up copy of files on any storage media connected to the host computer to any other storage media of the host computer. The automated back-up algorithm is any program which performs data or file back-up. Known and publicly available file back-up programs include Central Point Back-Up by Central Point Software or by a program such as Dantz Disk Fit. Other types of general error detection and correction algorithms which may be utilized with the present invention are included in MAC Tools or PC Tools from Central Point Software.

Turning back to the flowchart in FIG. 3, after the user selects the desired settings in step 302, the host computer sends a command to the disk drive assembly 200 to read the disk structure. The firmware within the SCSI drive causes the process controller 210 to intercept the read command from the process controller and transfers one or more of the utilities stored in nonvolatile memory 212 such as the compression and/or conversion and/or automated error detection including the secondary file allocation table or other vital areas of the disk back-up algorithm and/or the automated file back-up algorithms from the nonvolatile memory 212 to the host computer. Step 308 then reads the disk driver, if it exists, and transmits the disk driver to the host computer. Step 310 determines the disk type such as whether the disk is compressed, the operating system which created the disk, and other features relating to the disk. The host computer then mounts the disk as described above and the disk can then be written to or read in step 312.

At this point, the host computer has the algorithm necessary to perform any of the functions such as data compression, data format conversion, automatic disk error correction, automatic updating of the secondary file allocation table/disk structure or other vital areas of the disk, and automatic file back-up procedures. The user of the computer now may interact with menus or enter commands pertaining to the above-described algorithms in order to selectively engage, disable, or configure the algorithms which have been downloaded from the disk drive to the host computer. This interaction with the utility algorithms is performed by either the user input/output device 204 or the host computer 250.

The first embodiment of the invention discussed with respect to FIGS. 2 and 3 in which the algorithm is downloaded from the peripheral device to the host computer is particularly applicable to Macintosh computers and IBM compatible computers implementing the soon to be available Plug-and-Play system. However, the first embodiment is not limited to these computers but can be applied to any type of computer. Depending upon the type of host computer used with the peripheral device, the operation of the host computers will have to be modified but modifying the host computer to retrieve and execute an algorithm stored within a peripheral device is within the knowledge of one of ordinary skill in the art.

As an alternative to downloading an algorithm to the personal computer from the disk drive assembly, the present invention also contemplates a second embodiment which executes the algorithm directly within the disk drive assembly, thus eliminating the need to download the algorithm and freeing up the processor of the host computer to perform other tasks instead of executing the utility algorithm. Additionally, executing a utility algorithm within the peripheral device instead of by the host computer does not require the algorithm to be executed by different microprocessors running different types of operating systems. This will simplify the requirements for the algorithm when the peripheral device is to be used with different types of computers, as compared to the first embodiment, as the algorithm will only execute on one type of processor or processing circuitry which is located within the peripheral device.

Figure 4:
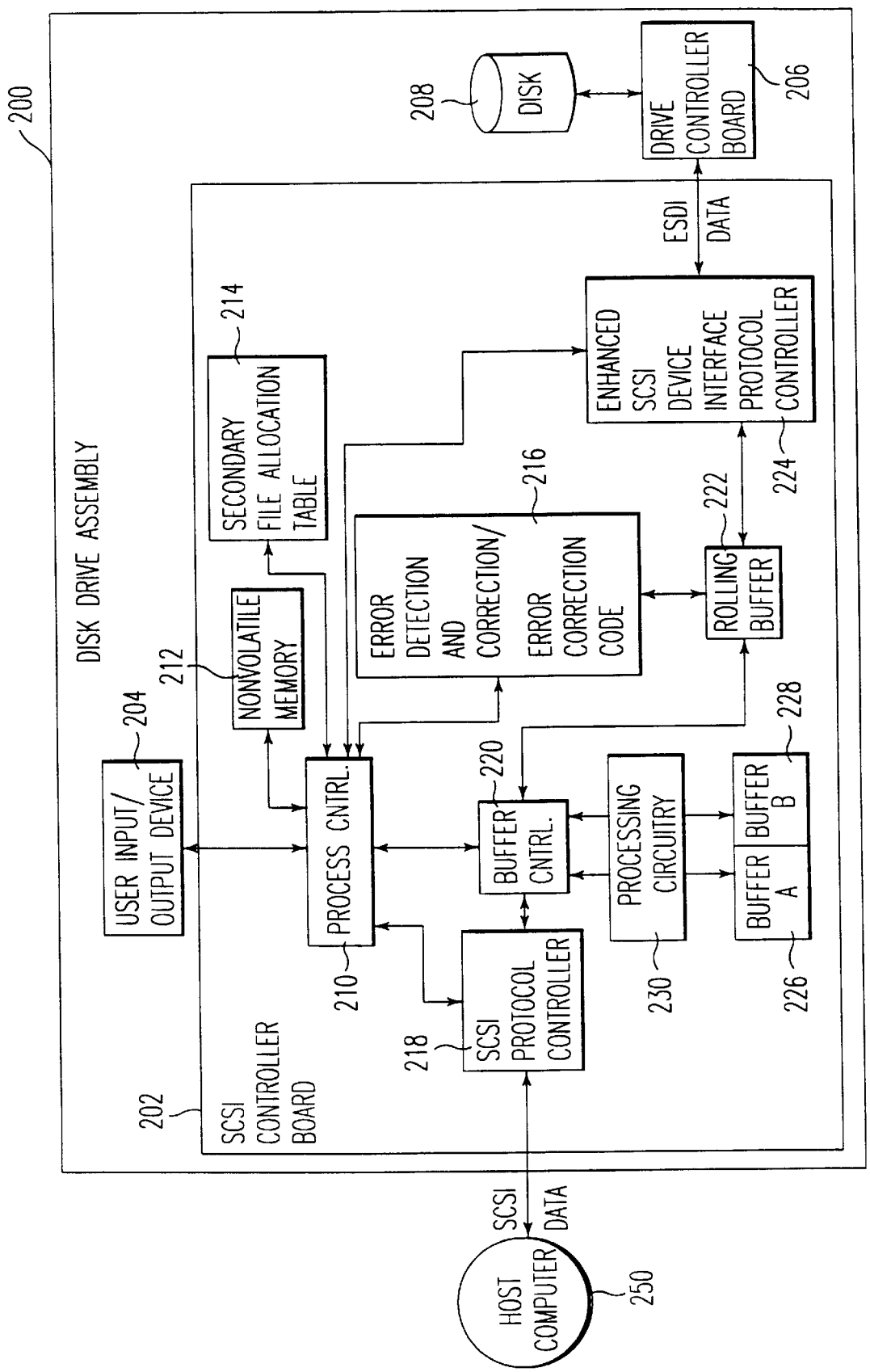
FIG. 4 is a hardware diagram of a disk drive assembly containing a utility which is executed within the disk drive assembly instead of the host computer.

The hardware diagram illustrated in FIG. 4 which is utilized with the second embodiment is the same as the hardware diagram of FIG. 2 except that processing circuitry 230 is inserted between the buffer controller 220 and buffers A and B, 226 and 228 respectively. In a first variation of the second embodiment, the processing circuitry 230 is a general purpose microprocessor which executes any of the above-described utility algorithms which are stored in the nonvolatile memory 212. When the processing circuity is a general purpose microprocessor, the microprocessor will require a memory for execution of the algorithm such as a random access memory. This memory is conveniently buffer A 226 or buffer B 228. As an alternative or in addition to using the buffers 226 and 228 with the microprocessor, the processing circuitry has its own random access memory. As a second variation of the second embodiment, instead of the processing circuitry including a general purpose microprocessor which executes a utility algorithm stored within the nonvolatile memory 212, the processing circuitry is special purpose circuitry constructed to execute the functions of the desired utility algorithm(s).

As described with respect to FIG. 3, when the algorithm is executed by the processing circuitry 230 in FIG. 4, the user input/output device would receive commands or settings from the user in order to determine which algorithm and the parameters of the algorithm stored in nonvolatile memory 212 is to be executed. The size of the buffers A and B or random access memory used by the processing circuitry will constrain the power and efficiency of the algorithms performed by the processing circuitry 230. For this reason, when it desired to increase the efficiency or capabilities of the processing circuitry and cost is not an overriding factor, it will be desired to increase the size of the random access memory used by the processing circuitry 230.

The specific structure of the disk drive assembly is not limited to the illustration of FIG. 4 but any type of circuitry within a peripheral device may be utilized as long as the circuitry is capable of executing the desired algorithm, thus freeing up the host processor 250 to perform other tasks. When flexibility is a desired feature for the functions of the disk drive assembly, the nonvolatile memory 212 and/or processing circuitry 230 will be contained on a device which is easily connectable to and removable from the disk drive and contained on a plug-in device such as a PCMCIA card. Even though the algorithms described with respect to FIG. 4 are described as running within the disk drive assembly, a variation of the invention includes the host computer controlling the execution of the algorithms by providing start commands, stop commands, and controlling the various parameters of the algorithms.

Figure 5:
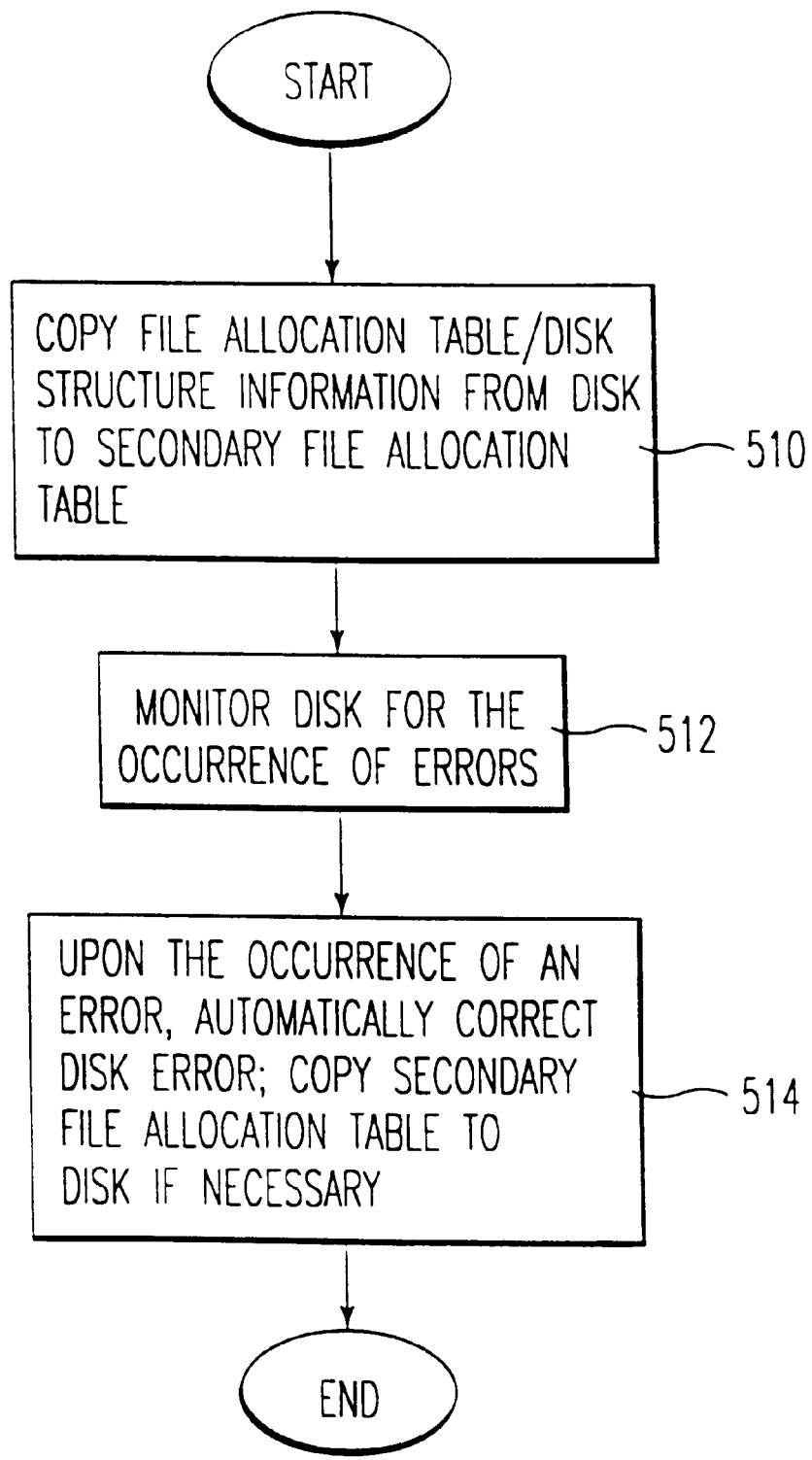
FIG. 5 is a flowchart illustrating a process for automatically performing an error monitoring and correction process.

FIG. 5 illustrates a flowchart used for general purpose error correction within the disk drive including the use of the secondary file allocation table. This process is executable on the hardware of the embodiments of FIGS. 2 or 4 (either of the first or second embodiments). Step 510 copies the file allocation table, disk structure information, or other vital areas of the disk, from the disk to the secondary file allocation table. Depending on desired features of the invention, the copying process will be performed every time the disk is written to, every predetermined time period regardless of disk activity, every time a specific amount of data is written to the disk, every time a predetermined time period expires during which the disk is written to, every time the file allocation or disk structure or any other vital areas of the disk are changed or updated, or upon any other desired conditions. Step 512 monitors the disk for the occurrence of errors on the disk or in the disk drive assembly. When an error is detected in step 512, step 514 automatically corrects the disk error by copying the secondary file allocation table/disk structure to the disk, if necessary, or by performing any other known type of disk error correction process such as those contained within MAC Tools or PC Tools.

Figure 6:
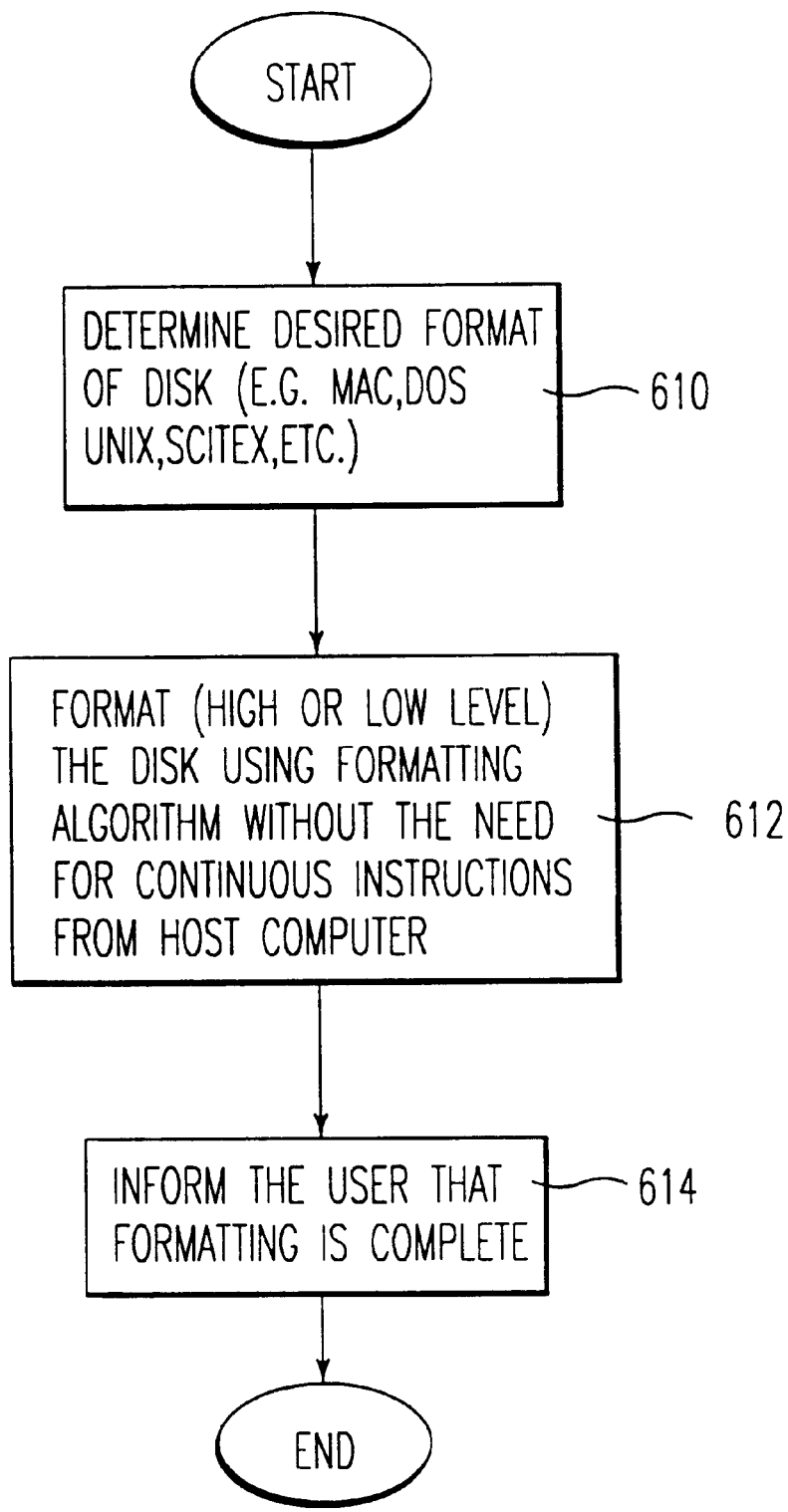
FIG. 6 is a flowchart illustrating a stand-alone formatting procedure.

FIG. 6 illustrates a process for stand-alone formatting of a disk without constant assistance/intervention by the host computer. This formatting process is applicable to any type of disk or tape or any other storage media which requires a formatting process. As the formatting function requires processing hardware within the disk drive assembly, the formatting algorithm will only be applicable to the second embodiment. However, if the first embodiment is modified to include processing circuitry, the stand-alone formatting is equally applicable to this modified first embodiment.

Turning now to the specific steps illustrated in FIG. 6, in step 610, the desired format of the disk is determined which is accomplished by reading a setting from the user input/output device 204. Variations to this step include determining the desired format by defaulting to the operating system format being used by the host computer, receiving commands from the host computer which specify the desired format, or determining the desired format in any other manner. Step 612 formats the disk using a formatting algorithm and process controller or processing circuitry within the disk drive assembly. The formatting algorithm is stored in the nonvolatile memory 212. As alternative variations, the formatting algorithm is contained in the processing circuitry 230, or transferred from the host computer to the disk drive assembly.

The command to begin the formatting process originates from the user input/output device 204. As an alternate variation, the formatting begin command is received from the host computer. However, the formatting procedure occurs within the disk drive assembly without the need for the host computer to constantly control the formatting process by executing the formatting utility algorithm using the processing circuitry 230.

The formatting performed is any type of formatting of any type of storage media and includes a low-level formatting, also referred to as a hard or physical formatting which writes the appropriate information to the disk including sector addresses, sync bytes, gap bytes, and any other desired or needed information into a preamble section of each sector of the disk, and a high level or logical formatting. After the formatting in step 612 is complete, step 614 informs the user that the formatting is complete using a visual and/or audible indication either by the user input/output device 204 or the host computer 250.

Obviously, numerous modifications and variations of the present invention are possible in light of the above teachings. It is therefore to be understood that, within the scope of the appended claims, the invention may be practiced otherwise than as specifically described herein. Further, the teachings of the invention are applicable to any type of computer system, peripheral device, operating system, or desired utility to be performed by the peripheral device.

What is claimed as new and desired to be secured by Letters Patent of the United States is:

1. A method for formatting a storage media within a peripheral device which is connected to a host computer, comprising the steps of:

receiving, by the peripheral device, a command to perform media formatting;

reading a formatting algorithm stored within the peripheral device; and formatting the media using the algorithm stored within the peripheral device;

wherein after said formatting step is begun, formatting of said media is performed without receiving commands from the host computer.

2. A method according to claim 1, wherein said step of receiving the command comprises:

receiving the command from an input device on the peripheral device.

3. A method according to claim 1, wherein said step of receiving the command comprises:

receiving the command from an input device on the host computer.

4. A method according to claim 1, wherein said formatting step comprises:

formatting one of a disk and a tape.

5. A method according to claim 1, further comprising the step of:

transferring the formatting algorithm from the host computer to the peripheral device before said reading step.

6. A system for formatting a storage media within a peripheral device which is connected to a host computer, comprising:

means for receiving, by the peripheral device, a command to perform media formatting;

means for reading a formatting algorithm stored within the peripheral device; and means for formatting the media using the algorithm stored within the peripheral device;

wherein after said formatting means begins formatting, formatting of said media is performed without receiving commands from the host computer.

7. A system according to claim 6, wherein said means for receiving the command comprises an input device on the peripheral device.

8. A system according to claim 6, wherein said means for receiving the command comprises an input device on the host computer.

9. A system according to claim 6, wherein said peripheral device is one of a disk drive and a tape drive.

10. A system according to claim 6, further comprising:

means for transferring the formatting algorithm from the host computer to the peripheral device.

11. A system according to claim 6, wherein said means for formatting comprises:

means for performing a low level format of the disk.

12. A system according to claim 6, wherein said means for formatting comprises:

means for performing a high level format of the disk.

13. A method according to claim 1, wherein said step of formatting comprises:

performing a low level format of the disk.

14. A method according to claim 1, wherein said step of formatting comprises:

performing a high level format of the disk.

* * * * *